May 13, 1969     E. F. BRILL     3,443,680
BORING-TYPE MINER CONVEYOR DRIVE
Filed March 24, 1967     Sheet 1 of 2
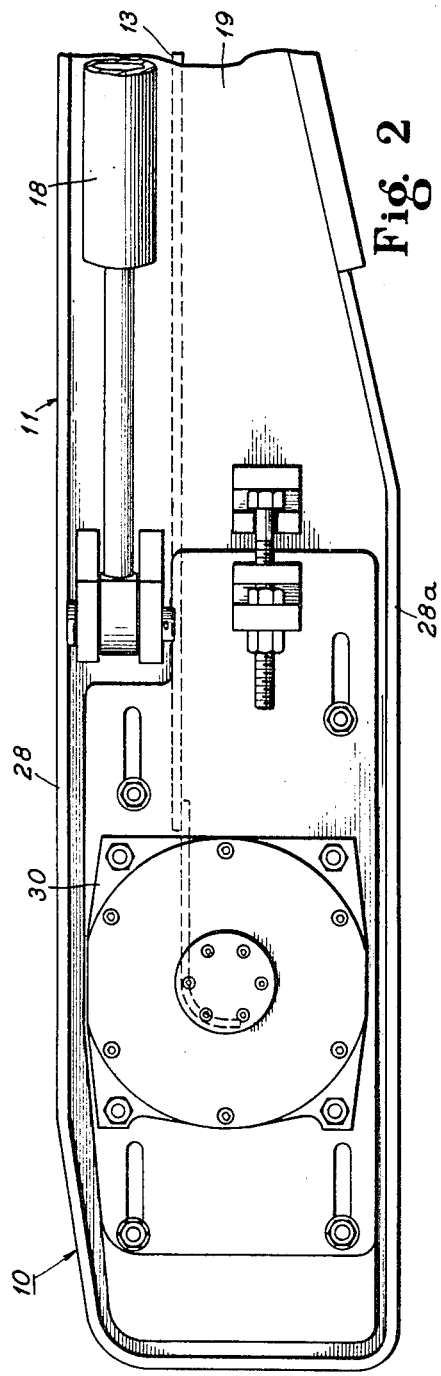
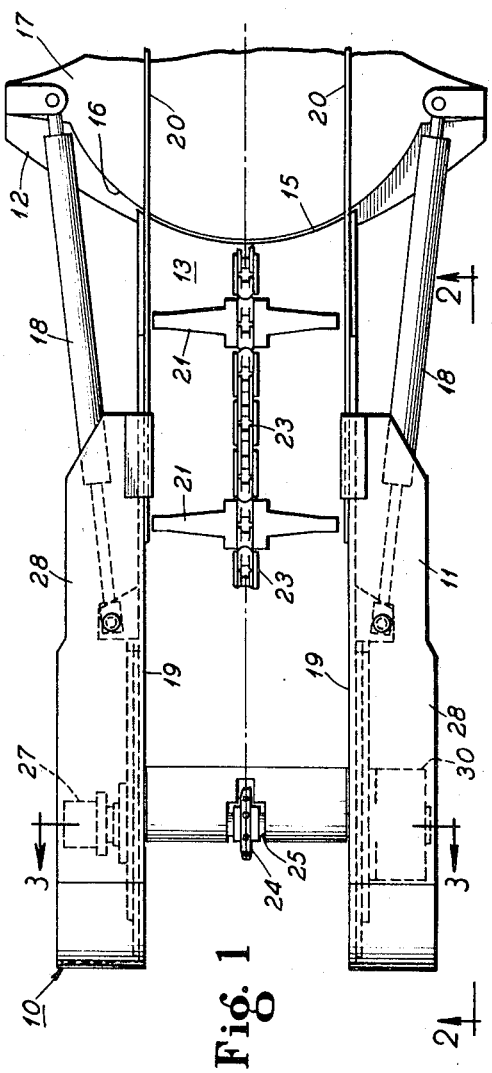
INVENTOR.
Edward F. Brill May 13, 1969 E. F. BRILL 3,443,680
BORING-TYPE MINER CONVEYOR DRIVE
Filed March 24, 1967 Sheet 2 of 2
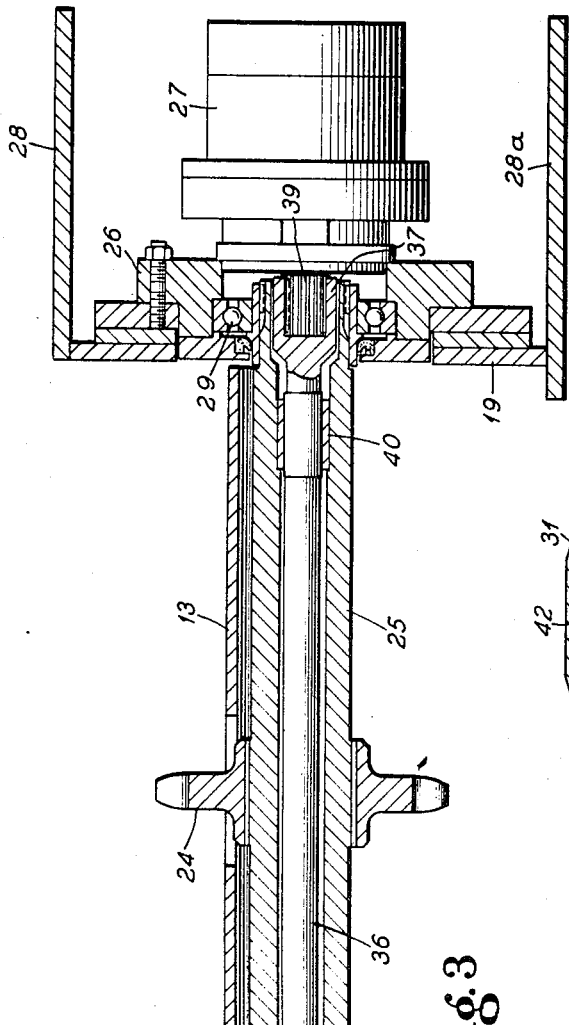
Fig. 3
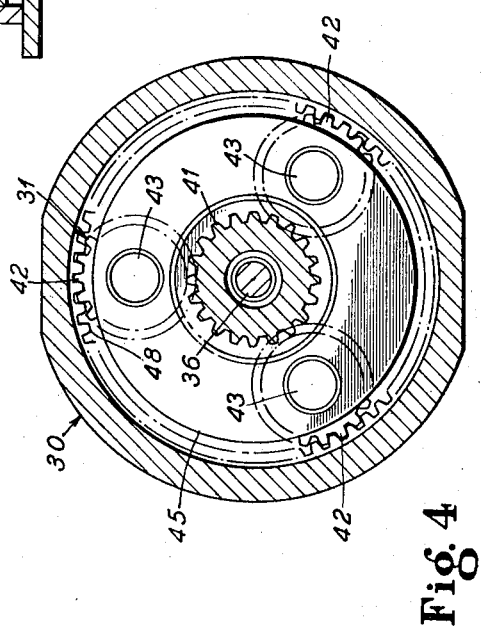
Fig. 4
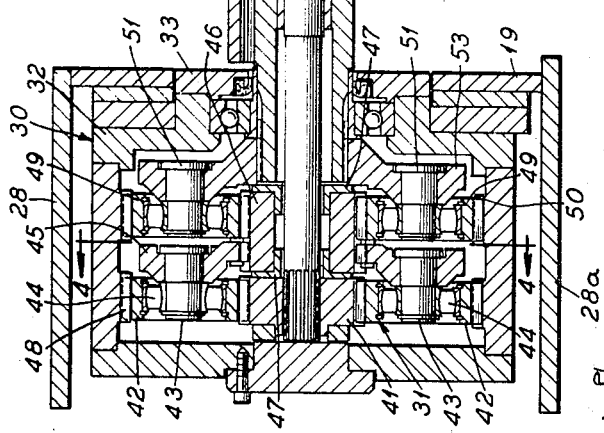
INVENTOR.
Edward F. Brill

United States Patent Office 3,443,680
Patented May 13, 1969

3,443,680
BORING-TYPE MINER CONVEYOR DRIVE
Edward F. Brill, Oconomowoc, Wis., assignor to Westinghouse Air Brake Company, Pittsburgh, Pa., a corporation of Pennsylvania
Filed Mar. 24, 1967, Ser. No. 625,800
Int. Cl. B65g 23/08
U.S. Cl. 198—203    1 Claim

ABSTRACT OF THE DISCLOSURE

Compact drive unit for conveyor for continuous mining machine in which lateral maneuverability of the conveyor is increased by increasing the clearance between the sides of the conveyor and the ribs of the working place without reducing the capacity of the conveyor. This is attained by driving the conveyor by a fluid pressure operated motor mounted on one side of the conveyor and driving the conveyor from the motor through a planetary geared reduction device mounted on the opposite side of the conveyor. The drive to the conveyor from the planetary is through a hollow shaft, and the drive from the motor to the planetary is through a torsion shaft coaxial with the hollow shaft.

Summary of invention and objects

The conveyor drive structure of the invention holds the width of the discharge end of the conveyor down to a size where the conveyor may be positioned between the side walls of shuttle cars, positioned to one side or the other of the machine for loading the shuttle cars, without reducing the capacity of the conveyor. This reduction in width and resultant increased maneuverability of the machine is attained by utilizing a planetary geared reduction unit as a speed reducer for driving the conveyor and by mounting the unit on one side of the conveyor frame and driving the planetary geared reduction unit from a fluid pressure operated motor on the opposite side of the frame, through a torsion drive shaft, cushioning the gearing and conveyor chain against sudden overloads.

A principal object of the invention, therefore, is to provide a more rugged and compact conveyor drive particularly adapted for continuous mining machines, retaining the width of the conveyor to a compact size where it may readily be positioned to load into shuttle cars, without reducing the capacity of the conveyor, by mounting the reduction gearing driving the conveyor on one side of the conveyor frame, and by driving the reduction gearing by a motor mounted on the opposite side of the conveyor frame.

Another object is to increase the range of maneuverability of the conveyor of a boring-type mining machine and the like, by driving the conveyor from a fluid pressure operated motor mounted on one side of the conveyor frame through a planetary geared reduction unit mounted on the opposite side of the conveyor frame.

Still another object of the invention is to improve upon the drive for conveyors particularly adapted for continuous minings, by driving the conveyor through planetary reduction gearing, driving a hollow shaft, and by driving the hollow shaft through a torsion shaft coaxial with the hollow shaft, in which the torsion shaft is driven from one end and drives the planetary reduction gearing from its opposite end.

These and other objects of the invention will appear from time to time as the following specification proceeds and with reference to the accompanying drawings.

Description of the drawings

FIGURE 1 is a partial fragmentary plan view of the rear end portion of a form of conveyor particularly adapted for a continuous mining and loading machine.

FIGURE 2 is a partial fragmentary view in side elevation of the rear end portion of the conveyor shown in FIGURE 1, and drawn to an enlarged scale.

FIGURE 3 is a sectional view taken substantially along line 3—3 of FIGURE 1 and showing certain details of the drive to the conveyor; and FIGURE 4 is a sectional view taken substantially along line 4—4 of FIGURE 3.

Description of preferred embodiment

In FIGURES 1 and 2 of the drawings, I have generally shown the discharge end of a conveyor 10 of the center strand laterally flexible chain and flight type, particularly adapted for a continuous mining machine, for picking up and loading the mined material onto a conventional material transporting means.

The discharge end of the conveyor 10 includes a frame 11 supported on a support 12 for movement transversely of said support and having a material carrying plate 13 having an arcuate advance face 15. The arcuate advance face 15 is movable along an arcuate face 16 of a stationary material carrying plate 17, mounted on the support 12.

Hydraulic jacks 18 extending along opposite sides of the conveyor frame are pivotally connected between opposite sides of the support 12 and opposite side walls 19, 19 of the conveyor for laterally swinging the discharge end of the conveyor from side to side, along the arcuate face of the stationary plate 17, in a conventional manner. Laterally flexible side walls 20, 20 form forward continuations of the side walls 19, 19 and are slidably guided therein and extend along the receiving end portion of the material carrying plate 13 and the discharge end portion of the stationary material carrying plate 17. The flexible side walls 20, 20 are suitably connected at their forward ends to the side walls of the conveyor (not shown), to form a continuous trough from the receiving to the discharge end of the conveyor.

The side walls 19, 19 extend above and below the material carrying plate 13 along opposite sides thereof and beyond the rear end thereof, and form a part of the support structure for the conveyor and confine the loose material to be carried along said material carrying plate 13 by spaced flights 21, vertically pivoted to opposite ends of lengths of chain 23, extending along the center of the plate 13 and about a drive sprocket 24 at the discharge end of the conveyor. The conveyor shown and described is a conventional form of laterally flexible single strand chain and flight conveyor, it being understood that various types of chain and flight conveyors are considered to come within the scope of the present invention.

The drive sprocket 24 is shown in FIGURE 3 as splined to a hollow shaft 25. The hollow shaft 25 extends across the conveyor frame and is journalled at one end in a mounting bracket 26 for a motor 27 on antifriction bearings 29. The motor 27 is shown as being a conventional form of fluid pressure operated motor. The mounting bracket 26 is adjustably mounted on the side wall 19, to enable the tension of the conveyor chain to be adjusted and extends outward of said side wall and is partially recessed therein. Said mounting bracket supports the motor 27 on the side wall 19 to extend outwardly therefrom within the confines of top and bottom protective plates 28 and 28a extending outwardly of the side walls 19 of the conveyor.

The opposite end of the hollow shaft 25 extends within a casing 30 for reduction gearing 31, herein shown as being double reduction planetary reduction gearing. The hollow shaft 25 is journalled in an end plate 32 for the casing 30 on antifriction bearings 33. The end plate 32 is suitably mounted on the opposite side wall 19 from the motor 27 and may be adjustably movable along said side wall to enable the conveyor chain to be adjusted to the proper tension. The end plate 32 supports the reduction gearing 31 and casing 30 to extend outwardly of said side wall 19 within the confines of the top and bottom protective plates 28 and 28a.

The hollow shaft 25 has a torsion shaft 36 coaxial therewith and driven at one end from the motor 27 and forming a drive member for the planetary reduction gearing 31 at its opposite end. As shown in FIGURE 3 the shaft 36 has an internally splined coupling end 37 forming a drive socket for an externally splined motor shaft 39. Spacer bearings 40 in the hollow shaft 25 uniformly space the shaft 36 from a hollow interior portion of the hollow shaft 25 and accommodate free relative rotation of said shafts with respect to each other.

The opposite end of the shaft 36 from the motor 27 is splined to a sun gear 41 of the planetary reduction gearing 31. The sun gear 41 meshes with planetary pinions 42 journalled on stub shafts 43 on self-aligning bearings 44. The stub shafts 43 are mounted on and project from a cage 45, internally splined to a sun gear 46, journalled for rotation coaxially of the shaft 36 on bearings 47, 47. The planetary pinions 42 mesh with an internal gear 48 formed integrally with the casing 30. The sun gear 46 in turn meshes with and drives planetary pinions 49, 49 about an internal gear 50 spaced inwardly of the internal gear 48 and formed integrally with the casing 30. The planetary pinions 49 are journalled on stub shafts 51, mounted on a cage 53, splined on the hollow drive shaft 25. The bearings for the planetary pinions 49 on the stub shafts 51 are the same as the bearings for the planetary pinions 42 on the stub shafts 43, so a description thereof need not be repeated herein. The cage 53 is splined to the hollow drive shaft 25 for driving said shaft.

The fluid pressure operated motor 27 is particularly advantageous for driving the conveyor, because of its compact size. The supply of fluid under pressure of the motor 27 may be under the control of conventional valve means (not shown) to drive the hollow shaft 25 through the torsion shaft 36 and the double reduction afforded by the planetary reduction gearing 31. The shaft 36 being a torsion shaft, in effect, winds up as loads are placed thereon and becomes torsion loaded, cushioning the planetary reduction gearing, as well as the conveyor chain, as heavy loads are placed on the chain, and particularly in instances where the flights may become fouled.

While I have herein shown and described one form in which the invention may be embodied, it should be understood that various modifications and variations in the invention may be attained without departing from the spirit and scope of the novel concepts thereof.

I claim as my invention:

1. In a flight conveyor particularly adapted for mining machines operable in spaces of confined width and height,
   a conveyor frame having a laterally movable discharge end movable about an upright axis and including laterally movable generally parallel side walls and a material carrying bottom plate extending between said side walls and having a rear discharge end portion,
   a single strand chain movable along said material carrying bottom plate about said rear discharge end portion and having flights spaced therealong extending from opposite sides thereof and guiding said chain for movement along said bottom plate,
   a drive sprocket at the discharge end of said bottom plate and meshing with said chain for driving said chain and flights;

the improvements comprising:
   a hollow drive shaft journalled for rotation about an axis coaxial with the axis of rotation of said drive sprocket and forming a drive member therefor, said hollow drive shaft extending outwardly of both of said side walls,
   a planetary speed reducer casing extending laterally outwardly of one side wall of said conveyor frame,
   means mounting said casing on its associated side wall for adjustable movement therealong,
   bearing means carried by said casing and forming a bearing support for said hollow drive shaft,
   planetary speed reducer gearing within said casing and having driving connection with said hollow drive shaft and including a first sun gear within said casing forming a drive gear for said planetary gearing,
   first and second internal gears, stationary relative to said casing,
   a second sun gear coaxial with and freely rotatable relative to said hollow shaft,
   a first cage associated with said first internal gear,
   planetary pinions journalled in said cage and meshing with said first sun gear and said first internal gear,
   a drive connection between said first cage and said second sun gear,
   a second cage,
   planetary pinions journalled in said second cage and driven by said second sun gear and meshing with said second internal gear,
   a driving connection between said second cage and said hollow shaft,
   a drive motor extending laterally outwardly of the opposite side wall and having a motor shaft coaxial with the axis of said hollow shaft,
   means mounting said motor on the associated side wall for adjustable movement therealong,
   a bearing carried by said mounting means forming a bearing for one end of said hollow drive shaft,
   a torsion shaft extending along said hollow drive shaft and journalled therein and coupled to and driven by said motor shaft at one end,
   said torsion shaft forming the sole suport and drive member for said first sun gear and cushioning the drive loads on said planetary reduction gearing,
   said motor being a fluid pressure operated motor, and said motor, said casing, said torsion shaft and said hollow drive shaft forming a unitary drive mechanism adjustable along said side walls, by adjustable movement of the mounting means therefor.

References Cited

UNITED STATES PATENTS

| 3,008,566 | 11/1961 | Biedness | 198—208 |
| 3,154,190 | 10/1964 | Gonski | 198—208 X |
| 2,243,358 | 5/1941 | Robins | 254—168 |
| 2,523,887 | 9/1950 | Thomson et al. | 198—203 |
| 3,169,797 | 2/1965 | Lundquist | 198—204 X |
| 3,323,779 | 6/1967 | Burnett | 254—168 |

RICHARD E. AEGERTER, *Primary Examiner.*

U.S. Cl. X.R.

74—797